United States Patent [19]
Erben et al.

[11] Patent Number: 4,860,858
[45] Date of Patent: Aug. 29, 1989

[54] SPOT-TYPE DISC BRAKE WITH RESETTING MEANS

[75] Inventors: Ralf Erben, Vallendar; Albert Langert, Neuwied; Frank-Wilhelm Madzgalla; Hans-Georg Madzgalla, both of Koblenz, all of Fed. Rep. of Germany

[73] Assignee: Lucas Industries public limited Company, Birmingham, England

[21] Appl. No.: 223,068
[22] PCT Filed: Nov. 10, 1987
[86] PCT No.: PCT/EP87/00694
 § 371 Date: Jun. 30, 1988
 § 102(e) Date: Jun. 30, 1988
[87] PCT Pub. No.: WO88/03614
 PCT Pub. Date: May 19, 1988

[30] Foreign Application Priority Data
Nov. 11, 1986 [DE] Fed. Rep. of Germany ... 8630214[U]
Aug. 31, 1987 [DE] Fed. Rep. of Germany ... 8711776[U]

[51] Int. Cl.$^4$ ............................................. F16D 65/54
[52] U.S. Cl. .................................. 188/71.8; 188/196 P
[58] Field of Search .................... 188/74.44, 71.7, 71.8, 188/196 P

[56] References Cited
U.S. PATENT DOCUMENTS

| 2,747,694 | 5/1956 | Helvern | 168/196 P X |
| 2,830,680 | 4/1958 | Hawley | 188/196 P X |
| 3,085,663 | 4/1963 | Jakeways | 188/196 P |
| 3,339,683 | 9/1967 | Burnett | 188/196 P |

FOREIGN PATENT DOCUMENTS
1213083 10/1959 France .......................... 188/196 P Primary Examiner—Duane A. Reger
Attorney, Agent, or Firm—Scrivener and Clarke

[57] ABSTRACT

In a spot-type disc brake for motor vehicles a floating caliper is guided displaceably on a brake support by means of sliding pins (26). Inner and outer brake pads are likewise displaceably mounted parallel to the sliding pins with respect to the brake support. On at least one of the sliding pins a resetting means (50) with a spring (52) is provided which is arranged around the sliding pin as part of a frictionally locking connection between the sliding pin and a bore guiding said pin. The bore (24) comprises at the end from which the sliding pin is inserted into said bore a widening (54) into which the spring (52) is installed with axial bias. The spring or a member cooperating therewith is in engagement with an outer surface of the sliding pin.

6 Claims, 4 Drawing Sheets

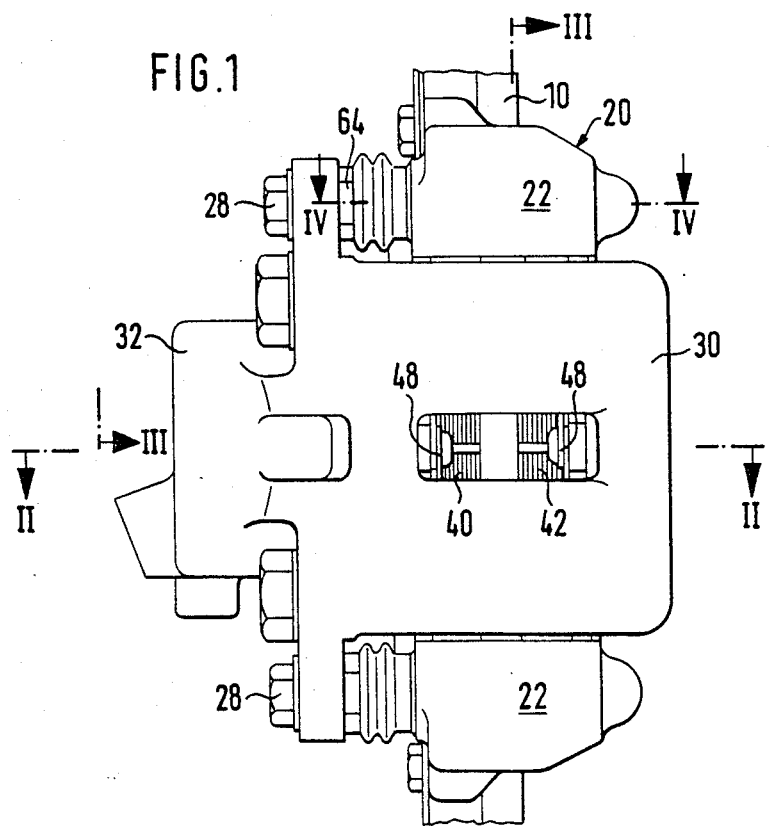
FIG. 1
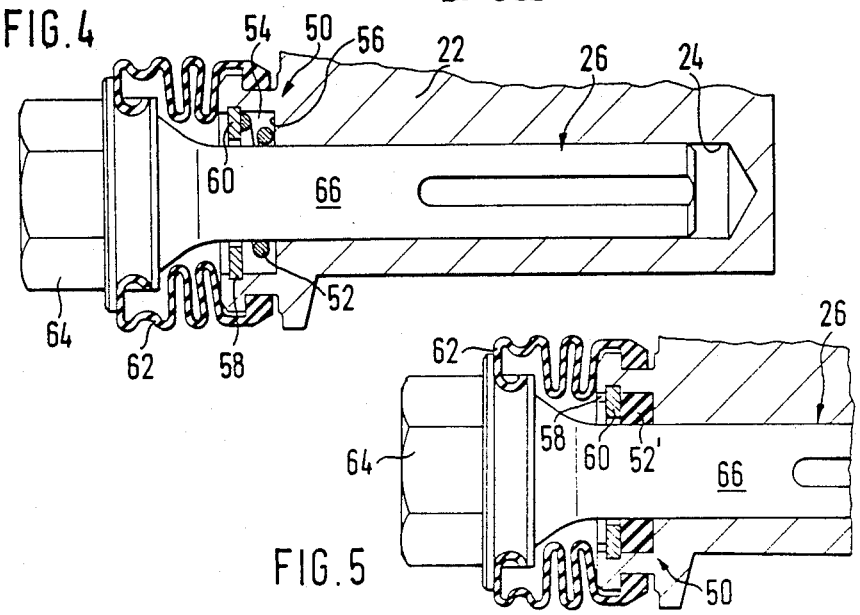
FIG. 4
FIG. 5

SPOT-TYPE DISC BRAKE WITH RESETTING MEANS

The invention relates to a spot-type disc brake, in particular for motor vehicles, comprising a floating caliper which is displaceably guided on a brake support by means of sliding pins, an inner and an outer brake pad which are displaceable parallel to the sliding pins with respect to the brake support, an actuator with which the inner brake pad is operable directly and the outer brake pad by displacement of the floating caliper and a resetting means on at least one of the sliding pins including a spring which is arranged around the sliding pin as part of a frictional connection between said pin and a bore guiding said pin and is resiliently yieldable to a limited extent in the axial direction.

In a known disc brake of this type (DE-PS 2,211,429) the sliding pins are detachably secured on the floating caliper and each displaceably guided in a bore of the brake support. In disc brakes of the type according to the preamble it is however also fundamentally possible for the sliding pins to be mounted on the brake support and each guided in a bore of the floating caliper. In both cases, on actuation of the brake the floating caliper is displaceable in such a manner that the outer brake pad, with respect to the associated vehicle, is pressed by the floating caliper against a brake disc when the actuator presses the inner brake pad directly against the brake disc. After actuation of the brake it is necessary for the two brake pads to be moved away from the brake disc by a predetermined distance, the so called release clearance. The release clearance should on the one hand be large enough to prevent under all circumstances, for example when the brake disc is deformed by heat or when travelling round a curve, the brake pads rubbing on the brake discs. On the other hand, the release clearance should be as small as possible to avoid making the pedal travel required on the next actuation of the brake unnecessarily large.

The release clearance of the brake pad operated directly by the actuator, the inner pad with respect to the vehicle, is generally governed by an actuating piston which is associated therewith and which is reset by a piston seal resilient in the axial direction. However, in disc brakes according to the preamble the resetting means mentioned at the beginning on at least one of the sliding pins is responsible for maintaining a predetermined release clearance of the outer brake pad actuable by displacement of the floating caliper.

In the known disc brake described the sliding pins each comprise at their end received in the associated bore an annular groove in which a spring element in the form of a resilient ring is accommodated in such a manner that its outer peripheral face bears in frictionally locking manner on the cylindrical wall of the bore. The spring element opposes a displacement in the axial direction with a frictional resistance such that its cross-section deforms resiliently under a normal brake actuation and thereby builds up an axial resetting force which suffices to return the floating caliper to its original position after the brake actuation. The frictional resistance between spring element and bore is however overcome on actuation of the brake when the release clearance due to wear of the brake pad has exceeded a predetermined amount; in this case the spring element in the bore is displaced into a new position from whence the spring element effects the resetting of the floating caliper after release of the brake.

With the known arrangement it has proved to be difficult and expensive to maintain with adequately narrow tolerances the dimensions, decisive for the magnitude of the frictional resistance, of the annular spring element, the sliding pin and the associated bore. The frictional resistance after overcoming which the spring element can be moved in the bore is thus subject to considerable fluctuations. If the frictional resistance is too small the spring element is unable to build up a resilient resetting force adequate for the return of the floating caliper; if however the frictional resistance is too large the brake pad displaceable by the floating caliper on actuation of the brake is pressed against the brake disc with a smaller force than the brake pad displaceable directly by the actuator.

The invention is therefore based on the problem of further developing a disc brake of the type described at the beginning in such a manner that in spite of inevitable production tolerances of its components responsible for resetting the floating caliper a predetermined resetting force can be maintained within narrow limits.

The problem is solved according to the invention in that the bore comprises at an end from which the associated sliding pin is inserted into said bore a widening into which the spring is installed with axial bias and that the sliding pin comprises in its region cooperating with the spring a cylindrical outer surface.

As a result for a given diameter of the sliding pin an annular spring of larger diameter than in the known brake according to the preamble can be installed and the axial bias of the spring can be fixed by simple steps, possibly even after installation of the sliding pin, in such a manner that in spite of inevitable diameter tolerances of the sliding pin and of the spring itself a predetermined frictional resistance to movements of the floating caliper is exactly achieved and thus also a predetermined resilient resetting force acting on the floating caliper.

These advantages of the arrangement according to the invention are independent of whether the spring is a ring of rubber or resilient plastic as known from cited DE-PS 2,211,429 or for example a helical spring which with a narrow convolution encloses in frictionally locking manner the sliding pin and with a wide convolution bears on the component on which the bore and the widening thereof are formed.

A resetting means having such a helical spring is provided in DE-GM 1,977,258 on the piston of a pneumatic or hydraulic brake actuator. In the latter the piston is arranged within a cylinder which is open at one end and is provided with an axial bore into which a pin mounted at the closed end of the cylinder projects. The bore has a widening in which the helical spring is arranged. The helical spring has at its two ends convolutions of large diameter which do not contact the pin and bear on a shoulder of the piston or on a disc mounted on the piston; between said ends the helical spring has convolutions of smaller diameter which surround the pin in frictionally locking manner. With this known arrangement only the actuating piston can be reset and adjusted but not the floating caliper of a disc brake. The pin mounted on the cylinder has no guide function and is only part of the resetting means which therefore represents a considerable constructional expenditure.

In contrast thereto, in the subject of the invention at least one of the sliding pins present in any case for guiding the floating caliper is used simultaneously as part of the resetting means without therefore having to be different in any feature at all from a sliding pin which is used only for guiding the floating caliper and does not cooperate with a resetting means.

In a preferred embodiment of the invention the spring is clamped between a shoulder defining the widening of the bore and a rigid ring crimped at the edge of the widening.

In a preferred further development of the invention the spring is divided into two parts and comprises a first spring element which is biased in axial direction and a second spring element which is biased in radial direction. With such a dividing of the spring into two the radially and axially acting biases can be adapted to each other in simple manner. The bias in the axial direction is less than the bias in the radial direction.

In a preferred embodiment of the invention as first spring element a helical spring and a second spring element a slit ring are provided. In such an embodiment of the two-part spring the sliding pin can be centered in simple manner with respect to the bore when the widening of the bore is conically formed and the slit ring tapers conically correspondingly on one side. With such an arrangement both the resetting force for the resetting means can be kept in narrow limits and an exact guiding of the sliding pins is ensured so that undesirable rattling of the parts against each other is avoided.

In a particularly preferred embodiment of the invention the second spring element is pressed by the first spring element in the radial direction. In this case the second spring element itself need not generate any bias in the radial direction but instead is pressed by the first spring element against the sliding pin.

It is also possible to press the second spring element in the axial direction by the first spring element and in a preferred embodiment the second spring element slides on a conical face in such a manner that a radial inwardly directed force component arises which presses the second spring element against the sliding pin.

The spring or spring elements may be made from rubber or resilient plastic. Examples of embodiment of the invention will be explained with further details hereinafter with the aid of schematic drawings, wherein:

FIG. 1 is a plan view of a spot-type disc brake,

FIG. 4 is an enlarged partial section IV—IV of FIG. 1, FIG. 5 shows a detail corresponding to FIG. 4 of another example of embodiment of the invention.

Figure 2:
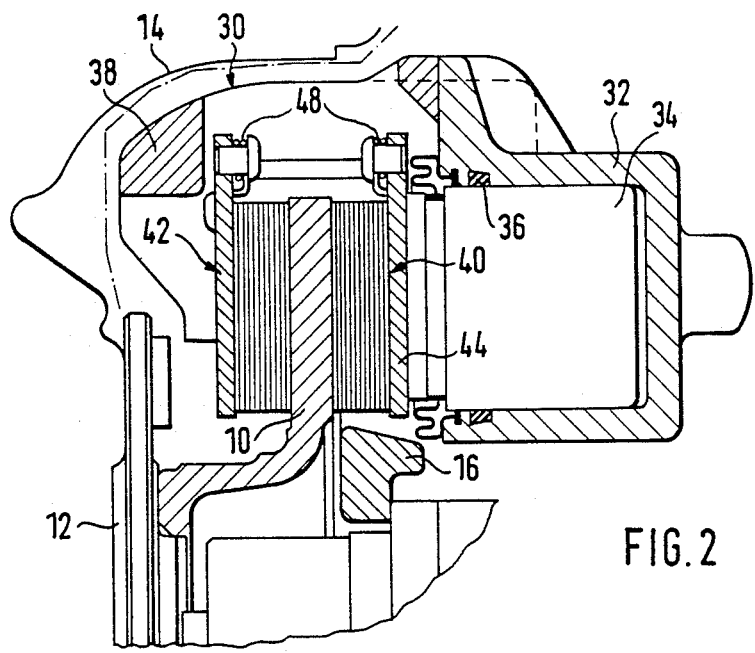
FIG. 2 is the axial section II—II of FIG. 1.
Figure 3:
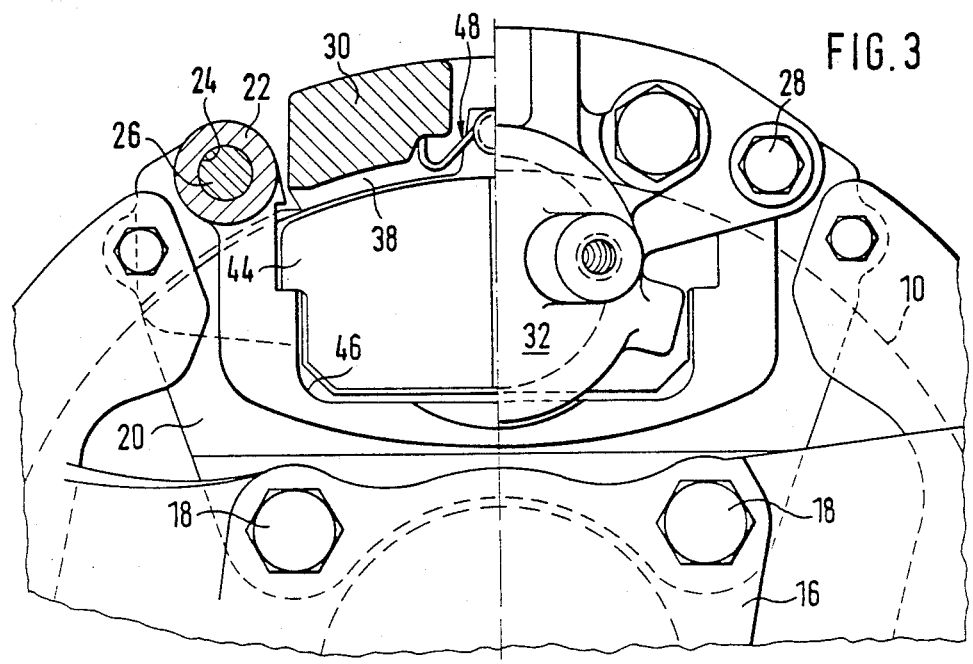
FIG. 3 is the side view of the brake shown partially as radial section III—III of FIG. 1.

The spot-type disc brake illustrated is associated with a brake disc 10 mounted on a wheel hub 12. In FIG. 2 part of an associated wheel rim 14 is also indicated. A brake support 20 having two arms 22 is secured to a stationary member 16 by means of a pair of screws 18. The arms 22 extend parallel to the axis of the brake disc 10 beyond the outer edge thereof and each have an axis-parallel bore 24. A sliding pin 26 is displaceably guided in each of the bores 24.

A floating caliper 30 is mounted in each case with a screw 28 on the two sliding pins 26 and also engages beyond the radially outer edge of the brake disc 10. At the axially inner end of the floating caliper 30 with respect to the associated vehicle a hydraulic actuator 32 is mounted which has a piston 34. The piston is surrounded by a resilient piston ring 36 which acts as seal and at the same time is constructed as resetting means for the piston. Axially opposite the piston 34 on the other side of the brake disc 10 a pair of legs 38 is formed on the floating caliper 30. Associated with the piston 34 is an inner brake pad 40 operable directly thereby. In corresponding manner an outer brake pad 42 is associated with the pair of legs 38 and is to be actuated by the actuator 32 indirectly by displacement of the floating caliper 30.

Each of the two brake pads 40 and 42 comprises a support plate 44 which is displaceably guided in a cutout 46 of the brake support 20 parallel to the axis of the brake disc 10 and is supported against forces in the peripheral direction and in the radial direction of the brake disc 10. Mounted on the support plate 44 of each of the two brake pads 40 and 42 is a holding-down spring 48 which bears radially outwardly on the floating caliper 30 and thereby biases the latter radially outwardly while it biases the brake pads radially inwardly and thereby prevents all these displaceable members from rattling on vibrations.

Associated with the floating caliper 30 is a resetting means 50 which tends after each actuation whenever the actuator 32 is pressureless to return said caliper to an inoperative position in which the outer brake pad 42 has a predetermined distance from the face of the brake disc 10 facing said caliper, said distance being referred to as brake release clearance, while the piston ring 36 ensures a corresponding release clearance for the inner brake pad 40.

Belonging to the resetting means 50 are two springs 52 each arranged round one of the sliding pins 26 in a respective widening 54 at the open end of the associated bore 24. Each of the widenings is defined on the one hand by a radial shoulder 56 of the associated bore 24 and on the other by a rigid ring 58 mounted by crimping 60 at the open end of the respective widening 54. The distance between the shoulder 56 and the ring 58 is so dimensioned that the spring 52 is kept under axial bias.

Each of the resetting means 50 is surrounded by a resilient packing sleeve 62 which sealingly connects the associated arm 22 to the associated sliding pin 26. Each of the sliding pins 26 has a hexagonal head 64 which is disposed outside the associated packing sleeve 62 and can be engaged with an open-ended spanner to prevent the respective sliding pin from turning when the floating caliper 30 is to be removed by releasing the associated screw 28, for example for replacing the brake pads 40 and 42.

In accordance with FIG. 4 each of the springs 52 is formed by a helical spring which has a narrow and a wide convolution. The narrow convolution encloses a cylindrical region 66 of the sliding pin 26 with radial bias and normally bears on the shoulder 56. The wide convolution of the spring 52 has a radial spacing from the cylindrical region 66 and bears on the ring 58.

On actuation of the brake the floating caliper 30 is moved inwardly, to the left in FIG. 4; each of the two sliding pins 26 entrains the narrow convolution of the associated spring 52 so that an axial resetting force is built up in the spring. These resetting forces ensure that after the release of the brake the floating caliper 30 is returned to its original position.

If however the movement of the floating caliper 30 occurring on actuation of the brake and thus also of the two sliding pins 26 exceeds the predetermined amount by which the narrow convolution of each of the two springs 52 is movable within the associated widening 54, a sliding relative motion then takes place between the sliding pins and the springs and the narrow winding thereof assumes a new starting position on the cylindrical region 66 of the associated sliding pin 26, from whence the floating caliper 30 is reset on release of the brake.

In the embodiment illustrated in FIG. 5 a ring of rubber or resilient plastic 52 acts like the spring 52 illustrated in FIG. 4 but compared with the latter has the additional advantage that the spring energy stored therein with the brake actuated is not lost even under strong vibrations and is thus available in every case with greater certainty for resetting the floating caliper 30.

Figure 6:
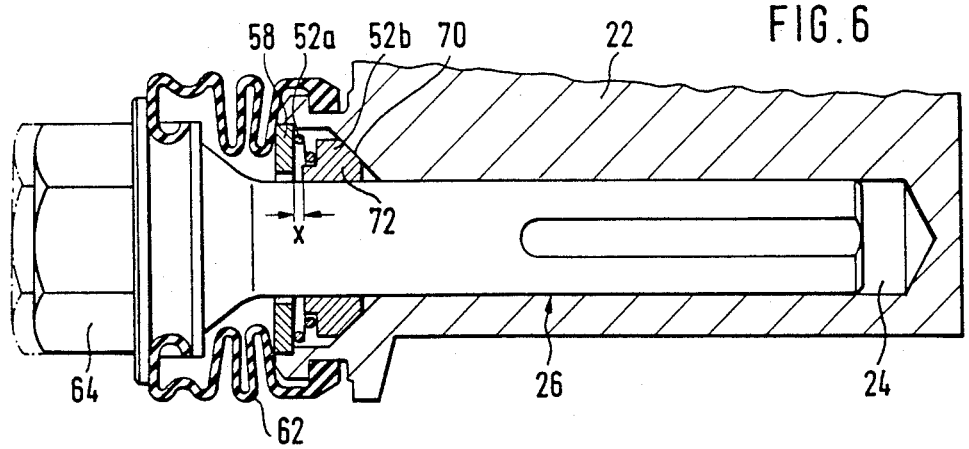
FIGS. 6 to 10 show further examples of embodiment of spot-type disc brakes according to the invention.

In the embodiment illustrated in FIG. 6 a spring corresponding to the spring 52 of FIG. 4 is divided into two parts and comprises a first helical spring element 52a and a second spring element 52b constructed as slit ring. In the installed state the second spring element 52b formed as slit ring is radially biased while the first helically formed spring element 52a is biased in the axial direction. The axial bias is substantially less than the radial bias. 2 kp has proved to be a suitable value for the axial bias while the radial bias is dimensioned so that a frictional force is generated between the slit ring and the sliding pin 26 which lies between 5 and 10 kp, i.e. the force which is necessary to move the slit ring on the sliding pin lies in said range.

In accordance with FIG. 6 the slit ring 52b is provided with a conical face 70 which is complementary to a conical face formed in the widening 54 of the bore 24. Consequently, the sliding pin 26 and the member carried thereby are exactly aligned and undesired rattling prevented.

When the brake is actuated the slit ring 52b is moved the distance "x", about 0.2 to 0.6 mm, with the sliding pin 26. The distance "x" corresponds to the release clearance. If the movement of the sliding pin exceeds the distance "x" the slit ring 52b meets the rigid ring 58 and is displaced on the sliding pin 26 corresponding to the wear of the brake linings so that the release clearance remains constant.

FIGS. 7 to 10 show further examples of embodiment. Parts corresponding to the examples of embodiment described so far are provided with the same reference numerals.

Figure 7:
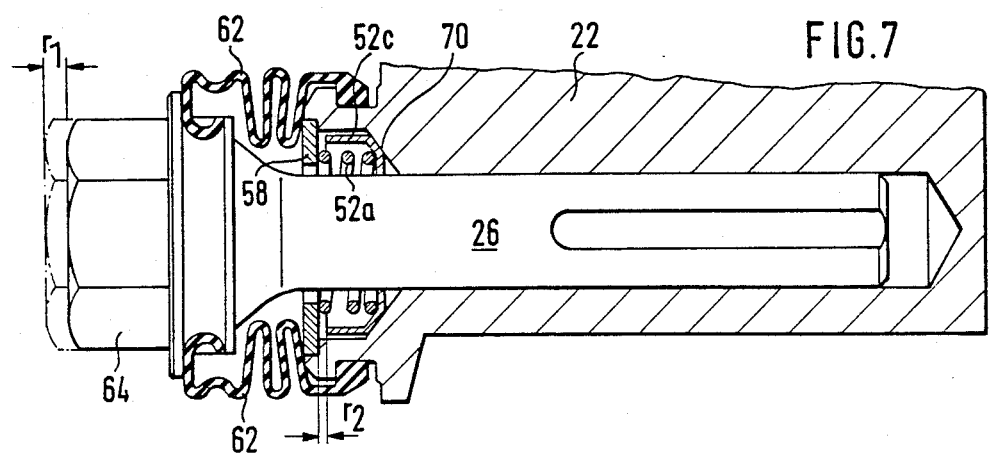

In the example of embodiment according to FIG. 7 the second spring element 52c is made cup-shaped and surrounds the first spring element 52d. The first spring element 52d bears in FIG. 7 on the left on the ring 58 and on the right presses the spring element 52c against the conical face 70 so that the second spring element 52c due to the sliding down on the conical face is given an inwardly directed force component and is thus pressed against the sliding pin 26. The reset distances are denoted by the reference numerals $r_1$ and $r_2$.

Figure 8:
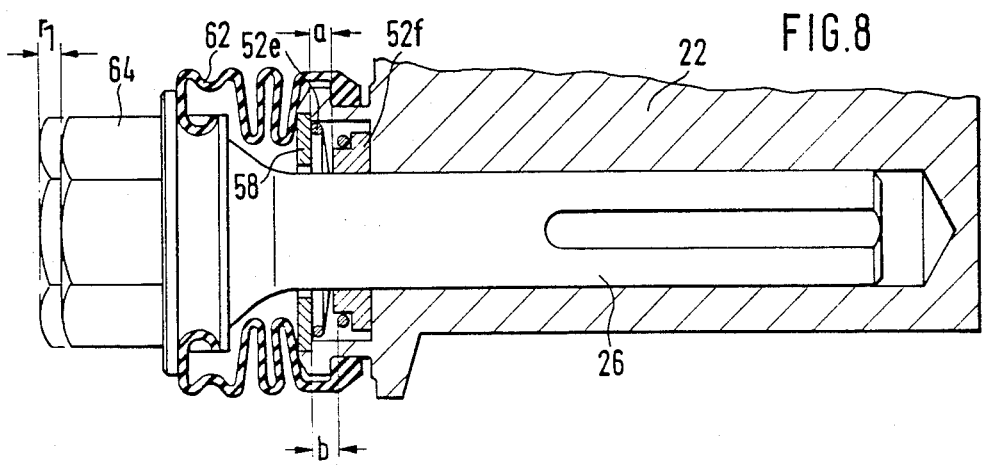

In the example of embodiment according to FIG. 8 the second spring element 52e is a slit ring of metal, for example brass. The diameter of the slit ring is somewhat smaller than the diameter of the sliding pin 26 so that the second spring element 52e presses with a desired bias against the sliding pin 26. The frictional force between the second spring element 52e and the sliding pin is set to 5 to 10 kp. According to FIG. 8 the distance a between the rigid ring 58 and the spring stop at the second spring element 52e is less than the distance from the rigid ring 58 to the last spring convolution so that the first spring element 52f is not stressed by blocking.

Figure 9:
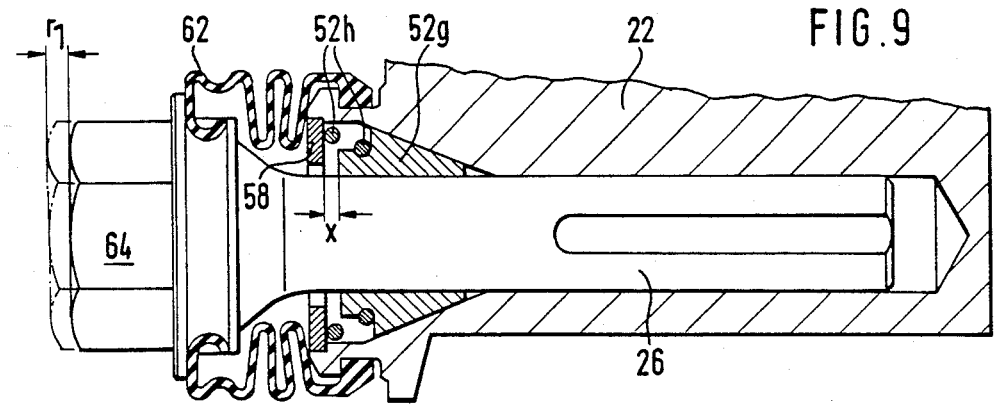

In the example of embodiment according to FIG. 9 the second spring element 52g is made conical and formed as slit ring. Suitable material for the second spring element 52g is steel, cast-iron, brass or plastic. The first spring element 52h engages with its convolution lying furthest to the right in the Figure in a recess round the second spring element 52g and holds the latter together. This generates part of the desired frictional resistance between the second spring element 52g and the sliding pin 26. At the same time the first spring element 52h presses in the axial direction against the second spring element 52g so that the latter slides down the conical face, thereby also causing a radially inwardly directed force component to act on the second spring element 52g.

Figure 10:
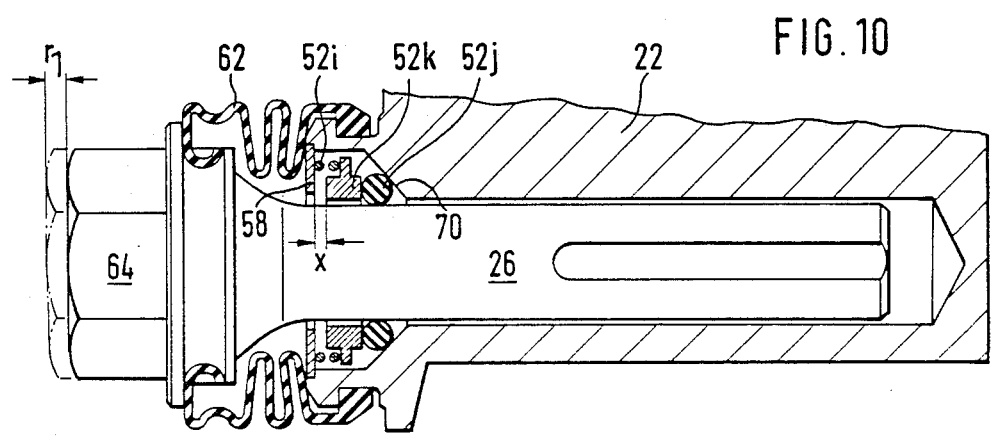

The embodiment according to FIG. 10 provides a three-part spring arrangement. In addition to the first and second spring elements 52i, 52j an intermediate piece 52k is provided. The first spring element 52i is made as in the example of embodiment of FIG. 7 as a helical spring acting in the axial direction. The second spring element 52j is formed as O-ring and bears on a conical face 70. The intermediate piece 52k transmits the force of the first spring element 52i acting in the axial direction to the O-ring 52j so that at the conical face 70 a radially inwardly directed force component arises which presses the O-ring against the sliding pin 26 and there generates the desired friction.

In all the embodiments, a slight play between the sliding pin 26 and the bore receiving said pin in the arms 22 of the brake support 20 is present due to tolerances in the manufacture. By the fixing provided in the described embodiments the sliding pin 26 is centered in the bore and tilting of the sliding pin positively prevented. This ensures easy moving of the brake.

We claim:
1. Spot-type disc brake comprising
   a floating caliper member which is displaceably guided on a brake support member by means of sliding pins,
   an inner and an outer brake pad which are displaceable parallel to the sliding pins with respect to the brake support member,
   an actuator with which the inner brake pad is operable directly and the outer brake pad by displacement of the floating caliper, and
   a resetting means on at least one of the sliding pins carried by one of said members including a spring which is arranged around the sliding pin as part of a frictional connection between said pin and a bore in the other of said members guiding said pin and is resiliently yieldable to a limited extent in an axial direction,
   the bore comprising at one end, from which the associated sliding pin is inserted into said bore, a widening in which the spring is installed, wherein
   the spring comprises a first and a second spring element,
   the first spring element is a coil spring and biased in axial direction, one end of said first spring element is supported by a rigid ring which is attached to an edge of the widening, and an other end of said first spring element is supported at the second spring element, said first spring element reacting against said second spring element to reset said floating caliper to its original position upon release of the brake, the second spring element comprises a conical surface which is urged into engagement with a complementary conical surface of said widening of said bore by the axial bias of said first spring element, characterized in that said second spring element is a slit ring which is radially biased into engagement with said pin and said radial bias is substantially greater than said axial bias produced by said first spring element, and that said second spring element and said first spring element act together to retain said pin substantially rattle free within said bore.

2. A spot-type disc brake as claimed in claim 1, wherein at least a portion of said radial bias is produced by the radial component of the axial force from the first spring element acting on the second spring element in the direction of the conical surface formed in the widening of the bore.

3. Spot-type disc brake comprising a floating caliper member which is displaceably guided on a brake support member by means of sliding pins, an inner and an outer brake pad which are displaceable parallel to the sliding pins with respect to the brake support member, an actuator with which the inner brake pad is operable directly and the outer brake pad by displacement of the floating caliper, and a resetting means on at least one of the sliding pins carried by one of said members including a spring which is arranged around the sliding pin as part of a frictional connection between said pin and a bore in the other of said members guiding said pin and is resiliently yieldable to a limited extent in an axial direction, the bore comprising at one end, from which the associated sliding pin is inserted into said bore, a widening in which the spring is installed, wherein the spring comprises a first and a second spring element, the first spring element is a coil spring and biased in an axial direction, one end of said first spring element is supported by a rigid ring which is attached to an edge of the widening, and an other end of said first spring is supported at the second spring element, said first spring element reacting against said second spring element to reset said floating caliper to its original position upon release of the brake, the second spring element comprises a conical surface and is clamped by the axial bias of the first spring element between a complementary conical surface of said widening of said bore and said pin, characterized in that said second spring element is a slit ring and radially biased, the radial bias being substantially stronger than said axial bias, and that said second spring element comprises a step which is embraced by a portion of the windings of said first spring element.

4. Spot-type disc brake comprising a floating caliper member which is displaceably guided on a brake support member by means of sliding pins, an inner and an outer brake pad which are displaceable parallel to the sliding pins with respect to the brake support member, an actuator with which the inner brake pad is operable directly and the outer brake pad by displacement of the floating caliper, and a resetting means on at least one of the sliding pins carried by one of said members including a spring which is arranged around the sliding pin as part of a frictional connection between said pin and a bore in the other of said members guiding said pin and is resiliently yieldable to a limited extent in an axial direction, the bore comprising at one end, from which the associated sliding pin is inserted into said bore, a widening in which the spring is installed, wherein the spring comprises a first and a second spring element, the first spring element is a coil spring and biased in an axial direction, one end of said first spring element is supported by a rigid ring which is attached to an edge of the widening, and an other end of said first spring is supported at the second spring element, said first spring element reacting against said second spring element to reset said floating caliper to its original position upon release of the brake, the second spring element comprises a conical surface and is clamped by the axial bias of the first spring element between a complementary conical surface of said widening of said bore and said pin, characterized in that said second spring element is cup-shaped and surrounds the first spring element.

5. Spot-type disc brake according to claim 1, characterized in that the second spring element is pressed by the first spring element in the radial direction.

6. Spot-type disc brake according to claims 1 or 2, characterized in that the second spring element comprises a resilient rubber-like material.

* * * * *